Figure 1:
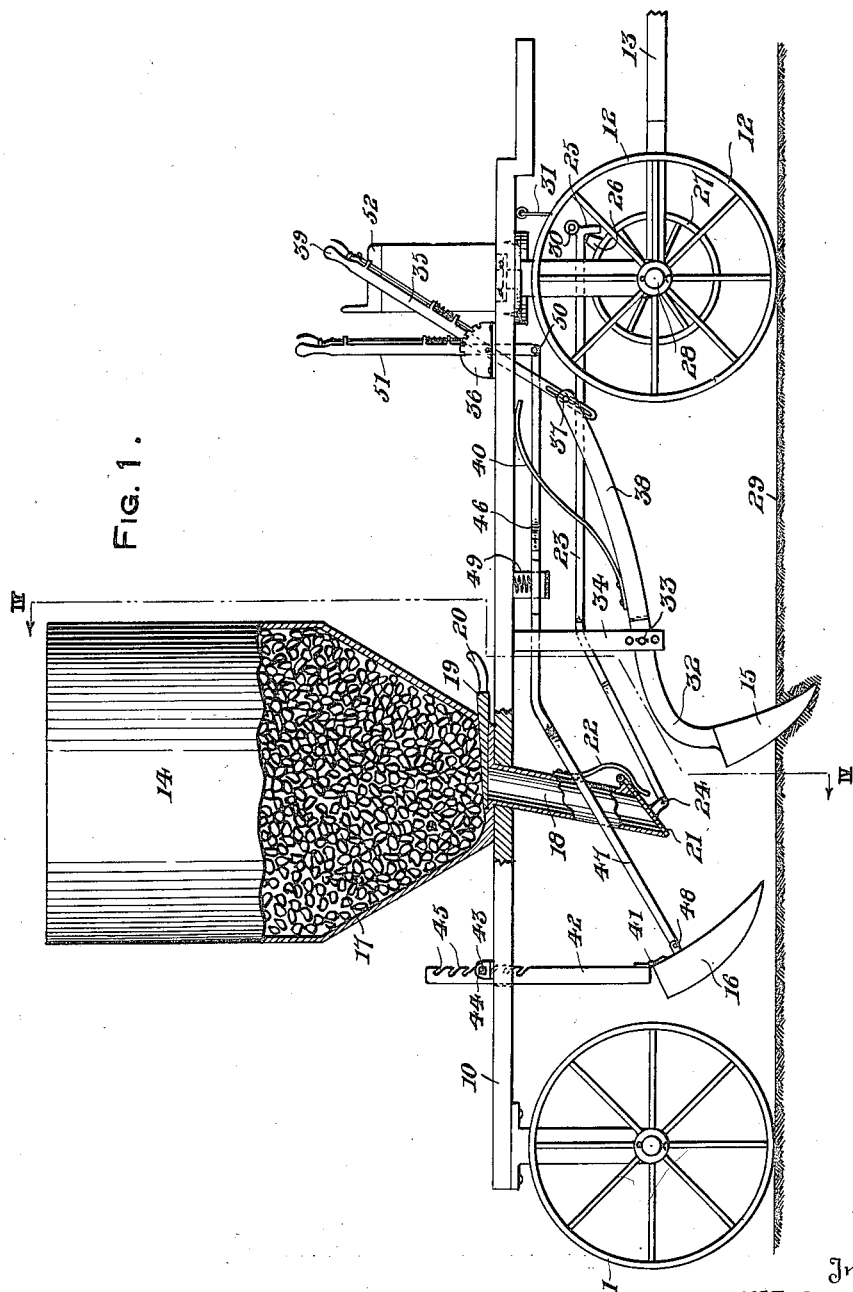

W. LUCOFF.
POTATO PLANTER.
APPLICATION FILED JULY 7, 1919.

1,322,915.

Patented Nov. 25, 1919.
3 SHEETS—SHEET 1.

Inventor
W. Lucoff

By A. M. Wilson
Attorney

W. LUCOFF.
POTATO PLANTER.
APPLICATION FILED JULY 7, 1919.

1,322,915. Patented Nov. 25, 1919.
3 SHEETS—SHEET 2.

Inventor
W. Lucoff

By
Attorney

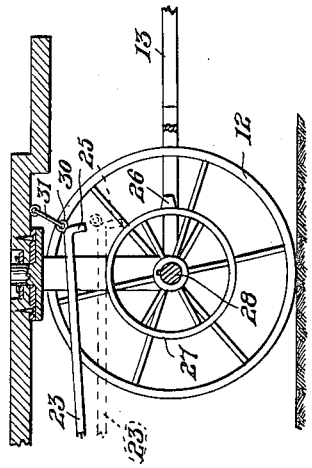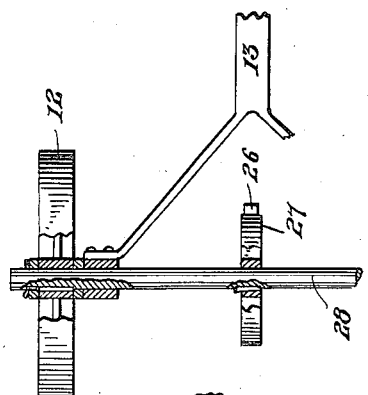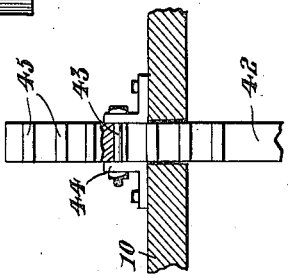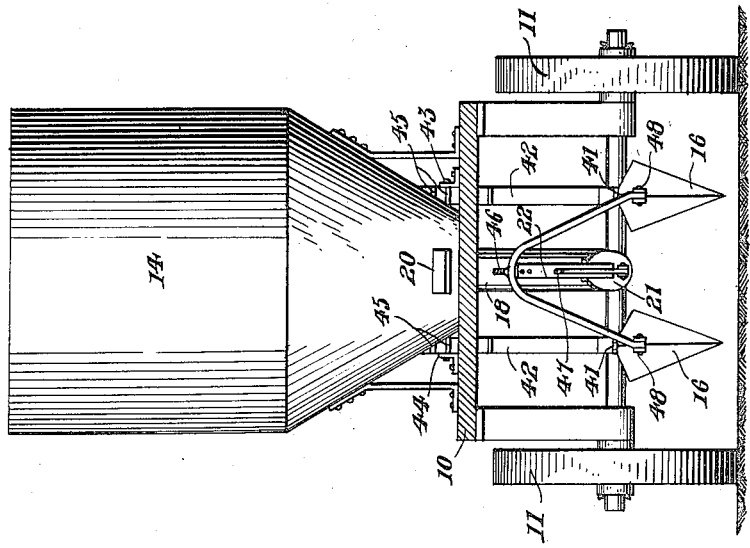

UNITED STATES PATENT OFFICE.

WASEL LUCOFF, OF BRUCE MINES, CANADA.

POTATO-PLANTER.

1,322,915.  Specification of Letters Patent.  Patented Nov. 25, 1919.

Application filed July 7, 1919. Serial No. 308,975.

*To all whom it may concern:*

Be it known that I, WASEL LUCOFF, a citizen of Ukraine, residing at Bruce Mines, in the Province of Ontario and Dominion of Canada, have invented certain new and useful Improvements in Potato-Planters, of which the following is a specification.

The primary object of the invention is the provision of a planter for potatoes whereby the dropping of the seed potatoes is made regular and even insuring a full crop, the device being capable of quickly planting large quantities of potatoes and requiring the work of only a single operator.

A further object of the invention is to provide a potato planter in the form of a vehicle adapted for dropping seed during the travel of the vehicle across the field, adjustable means being provided for forming a furrow for the deposit of the seed potatoes and for covering the furrows after the planting operation.

A still further object of the invention is the provision of a planting vehicle for seeds such as tubers adapted to automatically control the dropping of the seed at spaced intervals into a furrow made by the machine during its travel over the field, covering means being also provided for the furrow, the entire planting operation being controlled easily by the driver of the vehicle.

With these general objects in view the invention consists of the combination and arrangement of parts hereinafter more fully described in connection with the accompanying drawings and in which like reference characters designate corresponding parts throughout the several views, and in which—

Figure 2:
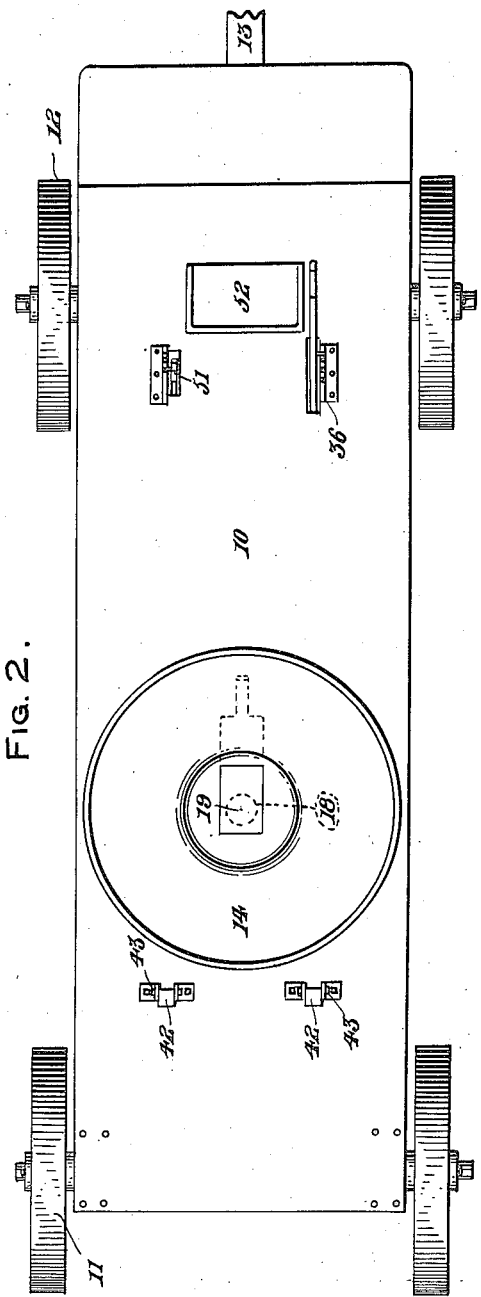
Figure 3:
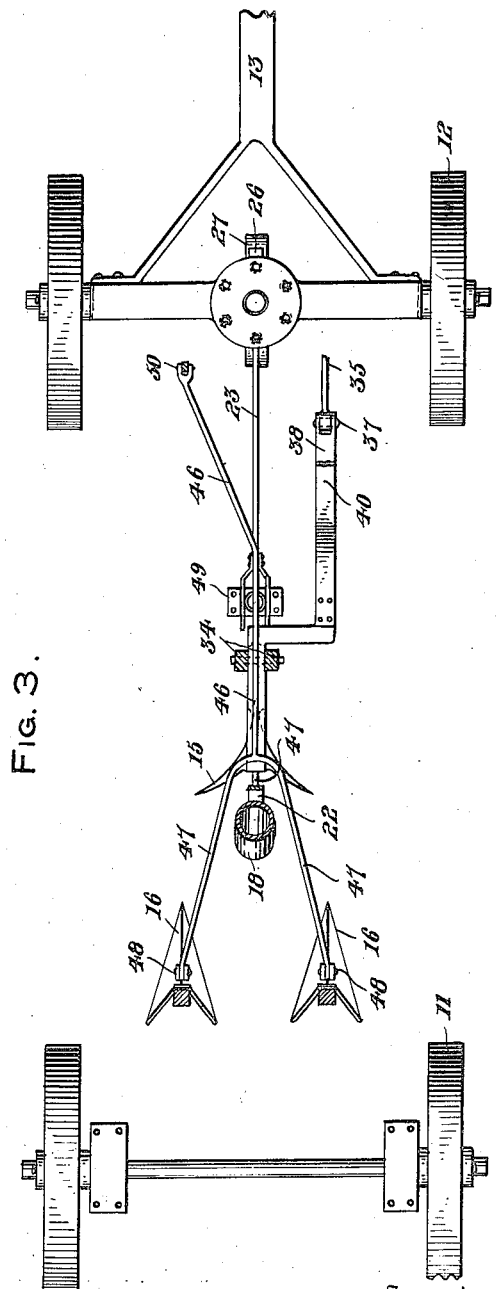

Figure 1 is a side elevation of the invention ready for use in planting potatoes, portions being broken away, Fig. 2 is a top plan view thereof, Fig. 3 is a horizontal sectional view taken beneath the level of the platform of the vehicle, with the platform removed, Fig. 4 is a vertical transverse sectional view taken upon line IV—IV of Fig. 1, Fig. 5 is a vertical longitudinal sectional view of the forward portion of the invention, Fig. 6 is a top plan view of the forward portion of the invention partially broken away, and Fig. 7 is an enlarged detail view of the adjusting means employed for the furrow-covering members.

My invention being designed for planting potatoes the same broadly consists of a vehicle having a platform 10, rear wheels 11, front wheels 12 and a draft tongue 13. A hopper 14 is provided upon the platform for the seed to be deposited in a furrow formed by a plow 15, and subsequently covered by two hoes 16. The hopper 14 has an open top for receiving seed potatoes 17 to be fed throug. an inclined spout 18 projecting through the platform 10 and manually controlled by means of a slide 19, above the platform having a handle 20.

A hinged cap or cover 21 upon the lower open end of the spout 18 is normally maintained closed by a spring 22. A lever 23 hinged at its rear end to the cap 21 as at 24 extends forwardly beneath the platform 10 with a hooked forward end or angular extension 25 adapted for engagement by a lug 26 projecting from a ring 27 upon revolving forward axle 28 of the vehicle.

In this manner, upon each revolution of the forward wheels 12 and axle 28, the lug 26 forwardly moves the lever 23, opening the cap 21 and permitting some of the potatoes 17 to fall upon the ground 29 beneath the vehicle, it being understood that the slide 19 is retracted.

When it is desired to move the vehicle without operating the feeding cap 21, the forward end of the lever 23 may be elevated and a ring 30 carried thereby engaged by a hook 31 depending upon the platform 10. The plow 15 is centrally mounted forwardly of the spout 18 by a curved shank 32 adjustably pivoted by a pin 33 in a depending bracket 34 secured to the platform 10. An operating lever 35 provided with an adjustment-retaining lug 36 upon the platform 10 is articulated as at 37 with the forward portion or angular extension 38 of the shank 32 and whereby the shifting of the lever 35 by means of the handle 39 at the upper end thereof elevates and lowers the plow 15 in a manner that will be apparent. A spring 40 carried by the extension 38 and bearing against the bottom of the platform 10 assists in raising the plow 15.

The bracket 34 comprises slightly spaced members with the shank 32 pivoted therebetween, while the lever 23 extending through the bracket 34 is thereby prevented from lateral displacement relatively of the ring 27. The hoes 16 are connected by hinges 41 with vertically adjustable rods 42 projecting through the platform 10 and maintained at the desired adjustment by means of a bolt 43 passing through ears 44 upon the platform over which the teeth 45 of the rods 42 are hooked.

A lever 46 beneath the platform being of Y-shaped form with its rearwardly projecting side portions or arms 47 hinged as at 48 to the hoes 16, passes through a bracket 49 upon the bottom of the platform and has its forward end pivoted at 50 to the lower end of a hand-lever 51 projecting upwardly through the platform 10 and pivoted thereto.

The levers 35 and 51 are positioned adjacent the opposite sides of the driver's seat 52 forwardly of the platform 10 whereby the plow 15 and the hoes 16 may be lowered and elevated at will while the quantity of potatoes 17 fed through the spout 18 is controlled by the slide 19.

With the slide 19 opened to the desired extent, the forward travel of the vehicle when the plow 15 and hoes 16 are lowered for engaging the soil 29 results in plowing a single furrow into which a substantially equal quantity of potatoes 17 is dropped into the furrow at each opening of the cap 21 at spaced intervals controlled by the arm 23 and lug 26. The hoes 16 rearwardly of the spout 18 at opposite sides of the furrow formed by the plow 15 cover the furrow subsequent to the dropping of the seed therein and complete by their covering operation the planting of the seed potatoes.

In this manner, the entire planting operation is easily and quickly accomplished, all of the operations being controlled from the driver's seat 52, it being understood that a tractor or other draft appliance not shown is attached to the tongue 23. It will be understood that while the preferred form of my invention is herein set forth, minor changes may be made therein without departing from the spirit and scope of the invention as claimed.

What I claim as new is:—

1. A planter comprising a vehicle having a platform, a seed hopper upon the platform with a rigid feed spout projecting through the latter, a seed controlling slide for the hopper above the platform, a normally closed cap hinged upon the lower end of the spout adapted to automatically open at spaced intervals during the forward movement of the vehicle and constituting a guide for the seed when opened and adjustable furrow digging and covering means carried beneath the platform respectively forwardly and rearwardly of the spout.

2. A planter comprising a platform, a seed hopper upon the platform, a downwardly projecting spout for the hopper extending through the platform with an open lower end, a spring-pressed normally closed cap upon the lower end of the spout, ground wheels supporting the platform having a revolving forward axle, a ring upon said axle, a lug upon said ring, an operating lever pivoted to the cap resting upon said ring when the device is in use and having a depending forward extension adapted for engagement by the lug upon each revolution of the forward axle, whereby the cap is opened at spaced intervals of time and means adapted for retaining the lever elevated in its inoperative position when the planter is not in use.

3. A planter comprising a vehicle having a platform, a hopper upon the platform with a feed spout extending therebeneath, a driver's seat upon the platform, a hand-operated controlling slide for the hopper outlet, a normally closed cap upon the bottom of the spout above the surface of the soil to be planted, automatic opening means for the cap adapted for opening the cap at spaced intervals of time during the forward travel of the vehicle, a furrow-forming plow forwardly of the spout, vertically adjustable hinged covering hoes for the furrow rearwardly of the spout and elevating and lowering means for said plow and hoes operable at points adjacent the opposite sides of the driver's seat.

4. A planter comprising a vehicle having a platform, and a revolving front axle, a ring centrally secured upon said axle, a radially projecting lug upon the ring, a seed hopper upon the platform, a rearwardly inclined outlet spout for the hopper projecting through the platform, a manually controlled slide between the hopper and spout whereby the flow of seed from the hopper to the spout is adapted for regulation, a closure cap hinged to the lower open end of the spout, a spring normally closing said cap, a lever having its rear end pivoted to the cap and forwardly extending in normal wiping contact upon said ring when the planter is in use, a depending angular extension at the forward free end of the lever adapted for engagement by said lug upon each revolution of the ring and forward axle whereby the cap is adapted for opening periodically, means for retaining said lever in the same vertical plane as the ring, and means adapted for maintaining the forward end of the lever elevated when the planter is not in use.

5. A planter comprising a vehicle having a platform, automatically operated seed-dropping means carried by the platform, furrow-plowing means adjustably provided forwardly of the seed-dropping means, furrow-covering hoes rearwardly of the seed-dropping means, vertically adjustable rods carried through the platform having hinged connections at their lower ends with said hoes, a Y-shaped operating lever having its arms straddling the seed-dropping means and pivoted to said hoes, an operating lever pivoted to the platform and operable thereabove and having pivotal connection with the forward end of said lever.

In testimony whereof I affix my signature.

WASEL LUCOFF.